United States Patent [19]

Hayashi et al.

[11] Patent Number: 4,869,935
[45] Date of Patent: Sep. 26, 1989

[54] METHOD AND APPARATUS FOR APPLYING SEALING MATERIAL TO AUTOMOTIVE VEHICLE BODIES

[75] Inventors: Sensuke Hayashi; Koji Ota; Hirofumi Hashimoto, all of Toyota, Japan

[73] Assignee: Toyota Jidosha Kabushiki Kaisha, Aichi, Japan

[21] Appl. No.: 154,040

[22] Filed: Feb. 9, 1988

[30] Foreign Application Priority Data

Feb. 14, 1987 [JP] Japan ................................. 62-32065

[51] Int. Cl.[4] ............................................. B05D 1/00
[52] U.S. Cl. .................................... 427/421; 118/314; 118/315; 118/323; 118/324; 118/697; 901/43; 198/346.1; 198/465.1
[58] Field of Search ............... 118/314, 315, 323, 324, 118/697, 698, 702, 704; 427/421; 198/341, 346.1, 465.1; 901/7, 43, 9

[56] References Cited

U.S. PATENT DOCUMENTS

| | | | |
|---|---|---|---|
| 3,709,190 | 1/1973 | Von Gottberg et al. | 118/323 X |
| 4,419,384 | 12/1983 | Kane et al. | 118/324 X |
| 4,498,414 | 2/1985 | Kiba et al. | 118/663 |
| 4,552,506 | 11/1985 | Cummins et al. | 414/735 |
| 4,564,100 | 1/1986 | Moon | 198/465.1 X |
| 4,636,136 | 1/1987 | Nomura et al. | 901/44 X |
| 4,714,044 | 12/1987 | Kikuchi et al. | 118/314 |
| 4,721,630 | 1/1988 | Takeo et al. | 118/314 X |

FOREIGN PATENT DOCUMENTS

81759  6/1980  Japan.
143876  7/1985  Japan.

Primary Examiner—Shrive Beck
Assistant Examiner—Alain Bashore
Attorney, Agent, or Firm—Oliff & Berridge

[57] ABSTRACT

Method and apparatus for applying a sealing material to vehicle bodies which are arranged in series such that front and rear sections of the bodies face each other. A first and a second sealing robots are provided on transversely opposite sides of the vehicle bodies. The first sealing robot is operated to apply the sealing material to one of two areas in an engine room covered by an engine hood of one of the two successive bodies, and the second sealing robot is operated to apply the sealing material to the other area in the engine room, or to one of two areas in a luggage compartment covered by a luggage compartment door of the other of the two successive bodies. The two areas in each of the engine room and the luggage compartment are divided by longitudinal centerlines of the two successive bodies. The first and second sealing robots are further operated to apply the sealing material to the areas in the engine room and luggage compartment, respectively, which areas have not been sealed.

10 Claims, 5 Drawing Sheets

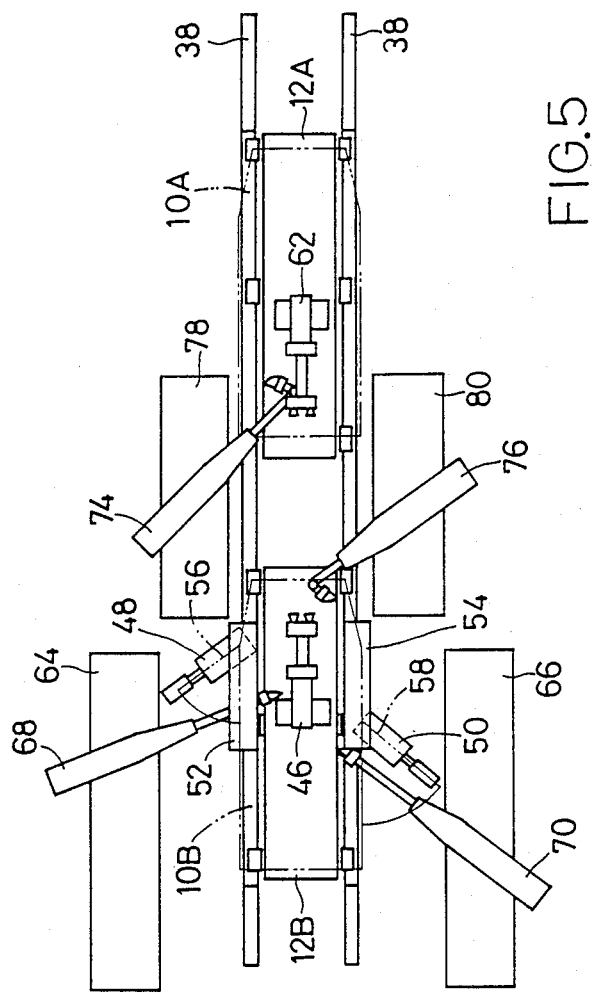

METHOD AND APPARATUS FOR APPLYING SEALING MATERIAL TO AUTOMOTIVE VEHICLE BODIES

BACKGROUND OF THE INVENTION

1. Field of the Invention

The present invention relates to a method and an apparatus which are suitable for applying sealing materials to predetermined portions of automotive vehicle bodies, such as seams of component members of the bodies.

2. Discussion of the Prior Art

Usually, bodies of automotive vehicles are formed by joining many component members (generally formed by pressing), for example, by spot welding. To ensure a high degree of fluid-tightness of the vehicle bodies, it is necessary to apply a suitable sealer to the seamed portions of the component members of the bodies.

In light of the above need, the assignee of the present application proposed a sealing method and apparatus for automatically applying a sealing material to vehicle bodies, as disclosed in Laid-Open Publication 60-143876 (published in 1985) of an unexamined Japanese Patent Application. In this proposed method and apparatus, there is provided a single sealing station at which the sealing material is applied to all portions of the vehicle body that should be sealed. Described more specifically, sealing robots are disposed on transversely opposite sides of the vehicle body, and on longitudinally opposite sides of the body. The sealing robots disposed on the transversely opposite sides of the vehicle body are adapted to apply the sealing material to right and left doors of the vehicle, portions of the vehicle body near the doors, and outer side surfaces of an engine hood and a luggage compartment door. The sealing robot disposed on the front side of the vehicle body is adapted to apply the sealing material to the inside of the front portion (engine room) of the vehicle body which is covered by the engine hood. Further, the sealing robot disposed on the rear side of the vehicle body is adapted to apply the sealing material to the inside of the rear portion (luggage compartment) of the body covered by the luggage compartment door.

The sealing robots disposed on the front and rear sides of the vehicle body to seal the insides of the front and rear portions of the body inevitably tend to be large-sized, and are considerably difficult to accurately control during the sealing operations. Further, these sealing robots are required to be positioned a suitable distance above the sealing station, in order to avoid an interference of the robots with the vehicle body, when the vehicle body is brought into the sealing station. This arrangement requires a rigid and massive frame for supporting the sealing robots above the sealing station, resulting in an increase in the cost of the sealing apparatus as a whole. Further, the same arrangement requires difficult procedures for adjustment and maintenance of the sealing robots.

SUMMARY OF THE INVENTION

It is therefore an object of the present invention to provide a sealing method suitable for applying a sealing material to vehicle bodies, which overcomes the problems addressed above.

Another object of the invention is to provide a sealing apparatus suitable for practicing the method of the invention.

According to the present invention, there is provided a method of applying a sealing material to predetermined portions of a body of an automotive vehicle which include seams of component members of the body, comprising the steps of: (i) arranging two vehicle bodies in series such that front and rear sections of the two vehicle bodies face each other; (ii) providing a first front/rear sealing robot on one of transversely opposite sides of the two vehicle bodies, and second front/rear sealing robot on the other side; (iii) effecting a first sealing operation which includes (a) operating the first front/rear sealing robot to apply a sealing material to predetermined sealing portions in one of two areas in an engine room covered by an engine hood of one of the two vehicle bodies, and (b) operating the second front/rear sealing robot to apply a sealing material to predetermined portions in one of two areas in a luggage compartment covered by a luggage compartment door of the other vehicle body, the two areas in the engine room being divided by a longitudinal centerline of the above-indicated one vehicle body, and the two areas in the luggage compartment being divided by a longitudinal centerline of the other vehicle body; and (iv) effecting a second sealing operation which includes (c) operating the first front/rear sealing robot to apply a sealing material to predetermined sealing portions in the other of the two areas in the luggage compartment of the other vehicle body, and (d) operating the second front/rear sealing robot to apply a sealing material to predetermined sealing portions in the other of the two areas in the engine room of the above-indicated one vehicle body.

The engine room and the luggage compartment may be provided in the front and rear sections of the vehicle body, respectively, or vice versa. In either case, the principle of the present invention may be practiced. According to a preferred arrangement of the invention, the above-indicated one of the two areas in the engine room of the above-indicated one vehicle body is located a greater distance away from the first front/rear sealing robot than the other area in the engine room, and the above-indicated one of the two areas in the luggage compartment of the other vehicle body is located a greater distance away from the second front/rear sealing robot than the other area in the luggage compartment. This arrangment does not require complicated movements of the robots so as to avoid an interference between the robots and the vehicle bodies.

In the sealing method of the present invention described above, sealing operations within the front and rear sections of the vehicle bodies are performed by first and second front/rear sealing robots which are disposed on the transversely opposite sides of the vehicle bodies. This arrangement does not require the robots to be so large as required in the known arrangement wherein the robots are disposed on the front and rear or longitudinally opposite sides of the vehicle body. Accordingly, the operating accuracy of the sealing robots can be significantly enhanced according to the instant sealing method. Further, the sealing robots disposed on the transversely opposite sides of the vehicle bodies will not interfere with the vehicle bodies. This means that the robots do not have to be positioned above the vehicle bodies, and consequently eliminate a structure for supporting the robots above the vehicle bodies. Therefore, the instant method makes it possible to reduce the cost of the sealing apparatus, and facilitate the adjustment and maintenance procedures for the sealing robots.

Although the necessary sealing operations on a single vehicle body are performed at different times at the two separate sealing stations, the required total sealing time for each vehicle body is not increased as compared with that where all the sealing operations are performed at one station, since the first and second sealing robots are operated concurrently, and no loss time is encountered.

According to the instant method of the invention, the required working area of each of the first and second sealing robots is only a half of the predetermined sealing area within the engine room or luggage compartment. In this respect, too, the size of the sealing robots can be reduced. That is, the two halves of the entire sealing part in one of the front and rear portions of a vehicle body are sealed by the respective two sealing robots at different times, at one of the two sealing stations, while the two halves of the entire sealing part in the other of the front and rear portions of the vehicle body are sealed by the respective robots at the above-indicated different times, at the other sealing station. Therefore, the required number of the sealing robots and the cost of the sealing apparatus including the robots will not be increased, as compared with that where the entire sealing areas in the front and rear portions of the vehicle body are sealed at one sealing station.

The third and fourth steps of effecting the first and second sealing operations described above may be replaced by the following steps: effecting a first sealing operation which includes (a) operating the first front-/rear sealing robot to apply a sealing material to predetermined sealing portions in one of two areas in an engine room covered by an engine hood of one of the two vehicle bodies, and (b) operating the second front/rear sealing robot to apply a sealing material to predetermined portions in the other of the two areas in the engine room, the two areas in the engine room being divided by a longitudinal centerline of the above-indicated one vehicle body; and effecting a second sealing operation which includes (c) operating the first front/rear sealing robot to apply a sealing material to predetermined sealing portions in one of two areas in a luggage compartment covered by a luggage compartment door of the other vehicle body, and (d) operating the second front/rear sealing robot to apply a sealing material to predetermined sealing portions in the other of the two areas in the luggage compartment of the other vehicle body, the two areas in the luggage compartment being divided by a longitudinal centerline of the other vehicle body.

The alternative arrangement offers the same advantages as described above, although the two sealing robots operate simultaneously on the same vehicle body at one of the two sealing stations and may interfere with each other and require complicated movements so as to avoid the interference.

According to another aspect of the invention, there is provided an apparatus for applying a sealing material to predetermined portions of a body of an automotive vehicle which include seams of component members of the body, comprising: (a) a first sealing station and a second sealing station, which are fixedly disposed in series; (b) a conveyor device for moving vehicle bodies to and from the first and second sealing stations, such that front and rear sections of two successive vehicles bodies face each other; (c) a positioning device provided for each of the first and second sealing stations, for positioning the vehicle bodies at predetermined positions at the first and second sealing stations, respectively; (d) a first front/rear sealing robot disposed on one of transversely opposite sides of the conveyor device, and between the first and second sealing station, and operable for applying a sealing material to predetermined sealing portions in one of two areas in an engine room covered by an engine hood of the vehicle body positioned at the first sealing station, and for applying a sealing material to predetermined sealing portions in one of two areas in a laggage compartment covered by a laggage compartment door of the vehicle body positioned at the second sealing station, the two areas in the engine room being divided by a longitudinal centerline of the vehicle body at the first sealing station, and the two areas in the laggage compartment being divided by a longitudinal centerline of the vehicle body at the second sealing station; and (e) a second front/rear sealing robot disposed on the other side of the conveyor device, in aligned relation with the first front/rear sealing robot, and operable for applying a sealing material to predetermined sealing portions in the other of the two areas in the engine room of the vehicle body at the first sealing station, and for applying a sealing material to predetermined sealing portions in the other of the two areas in the luggage compartment of the vehicle body at the second sealing station, the first and second front-/rear sealing robots being operated to effect simultaneous sealing operations.

The sealing apparatus of the invention constructed as described above is capable of practicing the method of the invention and therefore providing the same advantages as previously described. Moreover, the instant sealing apparatus is capable of accurately positioning the vehicle bodies, and therefore ensuring precise sealing operations at the predetermined sealing portions of the vehicle bodies.

According to one feature of the present apparatus, the first front/rear sealing robot is operated to apply the sealing materials alternately to the above-indicated one of the two areas in the engine room and to the above-indicated one of the two areas in the luggage compartment. The above-indicated one area in the engine room is located a greater distance away from the first front-/rear sealing robot than the other area in the engine room, and the above-indicated one area in the laggage compartment is located a greater distance away from the first front/rear sealing robot than the other area in the luggage compartment. On the other hand, the second front/rear sealing robot is operated to apply the sealing materials alternately to the other areas in the engine room and the luggage compartment. In this case, the second front/rear sealing robot performs sealing operations on the vehicle bodies at the first and second sealing stations while the first front/rear sealing robot is performing sealing operations on the vehicle bodies at the second and first sealing stations, respectively. This arrangement has no possibility of an interference between the first and second front/rear sealing robots, since the two robots act on the different vehicle bodies. It will be obvious that the first and second front/rear sealing robot may act on the vehicle body at either one of the two sealing stations, before acting on the vehicle body at the other station, provided that the two robots operate at the different stations.

According to an alternative feature of the present invention, the first front/rear sealing robot is operated to apply the sealing materials alternately to the above-indicated one of the two areas in the engine room and to the above-indicated one of the two areas in the luggage compartment. In this case, however, the above-indicated one area in the engine room is located a smaller distance away from the first front/rear sealing robot than the other area in the engine room, and the above-indicated one area in the luggage compartment is located a smaller distance away from the first front/rear sealing robot than the other area in the luggage compartment. Further, the second front/rear sealing robot is operated to apply the sealing materials alternately to the other areas in the engine room and the laggage compartment. As in the above case, the second front-/rear sealing robot performs sealing operations on the vehicle bodies on the first and second sealing stations while the first front/rear sealing robot is performing sealing operations on the vehicle bodies at the second and first sealing stations, respectively. Further, since the robots apply the sealing materials to the bearer one of the two areas in the engine room and the luggage compartment, the robots may use a relatively short arm which has a small moment of inertia, which permits increased operating speed and accuracy.

According to another alternative feature of the present apparatus, the first and second front/rear sealing robots apply simultaneously the sealing materials to the two areas in one of the engine room of the vehicle body at the first sealing station and the luggage compartment of the vehicle body at the second sealing station, and subsequently apply simultaneously the sealing materials to the two areas in the other of the engine room and the luggage compartment.

According to a further feature of the present apparatus, the conveyor device comprises a plurality of carts for supporting and positioning the vehicle bodies, respectively, and means for moving the plurality of carts to the first and second sealing stations, and the positioning device comprises guide rails which extend through the first and second sealing stations and which support the plurality of carts so as to position the carts in a transverse direction thereof. The positioning device further comprises longitudinal positioning means provided for each of the first and second sealing stations, for positioning the plurality of carts in a longitudinal direction thereof.

According to a still further feature of the instant sealing apparatus, discriminating means is provided for detecting different types of the vehicle bodies, and the first and second front/rear sealing robots are operated to effect sealing operations depending upon the detected types of the vehicle bodies. Thus, the sealing operations are adapted to the different types of vehicle bodies.

In accordance with a yet further feature of the instant apparatus, a hood opening device is disposed at the first sealing station, for automatically opening and closing the engine hood, and a door opening device is disposed at the second sealing station, for automatically opening and closing the luggage compartment door.

BRIEF DESCRIPTION OF THE DRAWINGS

The above and other objects, features and advantages of the present invention will become more apparent by reading the following detailed description of presently preferred embodiments of the invention, when considered in connection with the accompanying drawings, in which:

FIG. 5 is a fragmentary plan view corresponding to that of FIG. 1, showing a modified embodiment of the invention.

DETAILED DESCRIPTION OF THE PREFERRED EMBODIMENTS

Figure 1:
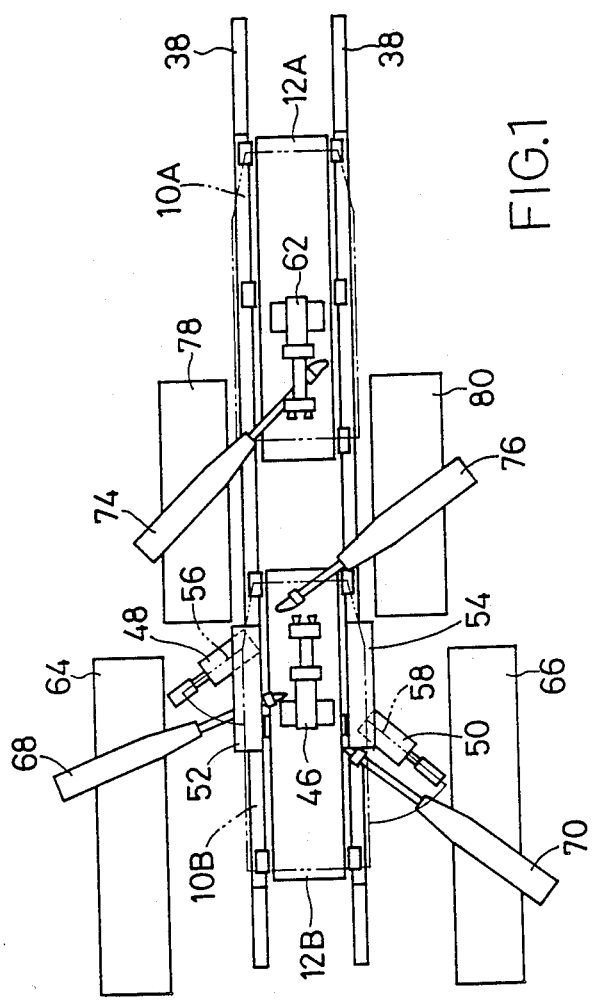
FIG. 1 is a fragmentary plan view of one embodiment of a sealing apparatus of the present invention.
Figure 2:
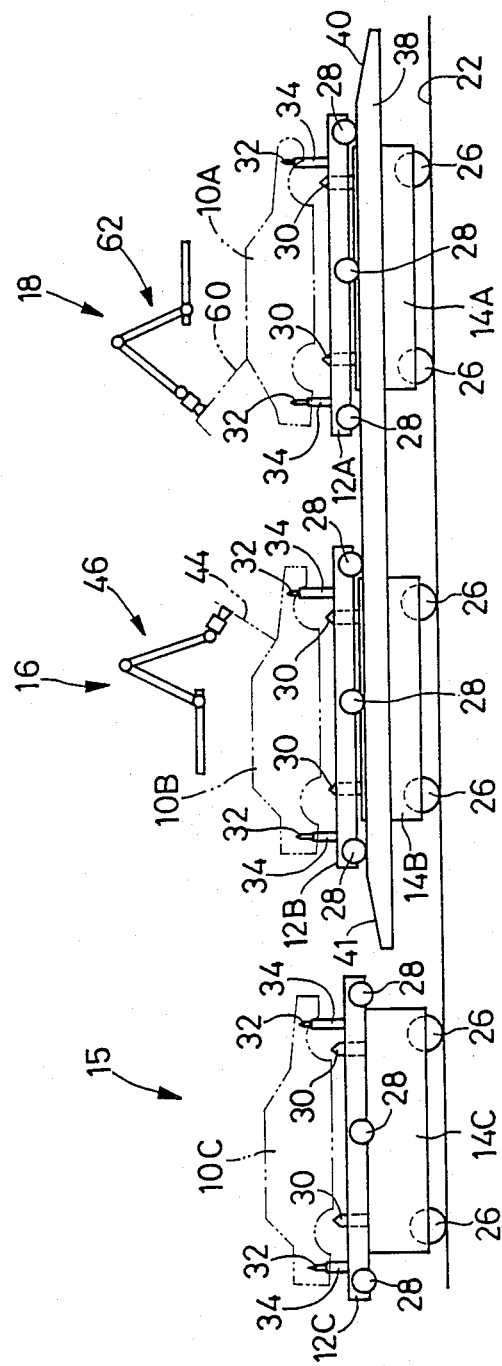
FIG. 2 is a side elevational view of the portion of the apparatus shown in FIG. 1.

Referring first to the plan and side elevational views of FIG. 1 and 2, reference numerals 10A, 10B, 10C designate examples of vehicle bodies which are sealed according to the presently preferred embodiment of the invention. The vehicle bodies 10A, 10B, 10C, etc. are supported and positioned on respective carts 12A, 12B, 12C, etc., which are moved by respective electrically driven carriers 14A, 14B, 14C, etc., from a standby station 15, to a first sealing station 16 and to a second sealing station 18. The standby station 15 and the first and second sealing stations 16, 18 are provided in series in mutually spaced-apart relation with each other, and the vehicle bodies 10A, 10B and 10C are oriented such that the front section of each vehicle body faces the rear section of the preceding vehicle body. The carts 12A, 12B, 12C, etc. cooperate with the respective electrically driven carriers 14A, 14B, 14C, etc., to constitute a conveyor device for moving the vehicle bodies 10A, 10B, 10C, etc. through the first and second sealing stations 16, 18,. The carts 12A, 12B, 12C, etc. have different configurations suitable for different types of the vehicle bodies, but have similar basic structures, and the carriers 14A, 14B, 14C, etc. have the same structure. For this reason, the cart 12A and the carrier 14A will be described in detail, by way of example.

Figure 3:
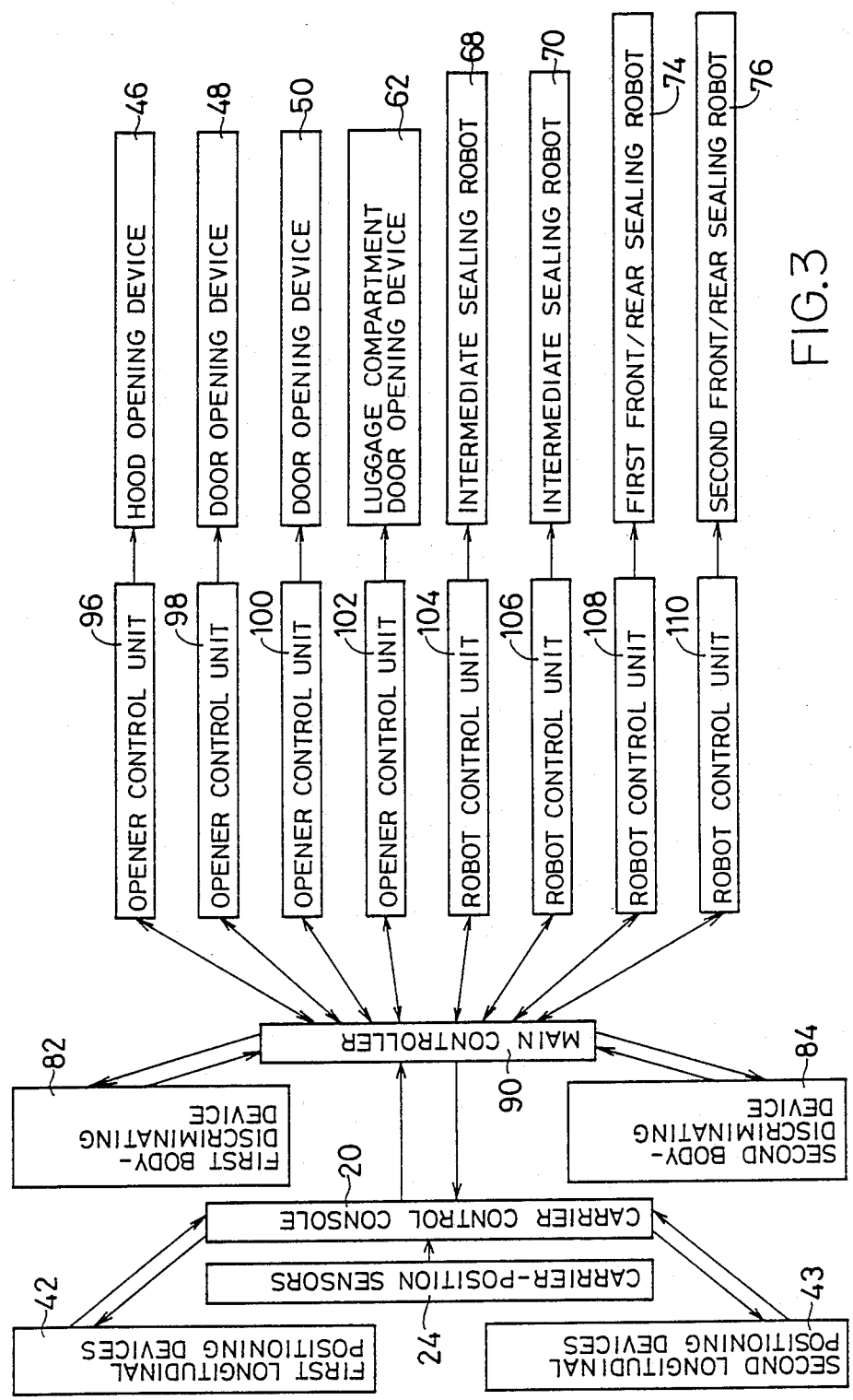
FIG. 3 is a schematic block diagram showing a control system of the sealing apparatus of FIGS. 1 and 2.

The electrically driven carrier 14A is movable on rails 22 laid on the floor of a plant, under the control of a carrier control console 20 as indicated in FIG. 3. The control console 20 is adapted to control the activation and deactivation of the carrier 14A, and its travelling speed. Carrier-position sensors 24 are provided along the rails 22, to detect the current positions of the carrier 14A and the other carriers (14B, 14C, etc.), so that the carriers are controlled by the control console 20 according to signals from the sensors 24 such that the adjacent carriers travel while maintaining a constant distance equal to a distance between longitudinal centers of the first and second sealing stations 16, 18 in a direction of movement of the carriers. Thus, an otherwise possible collision of the carriers is prevented. The carrier 14A has wheels 26 made of a rubber so as to minimize traveling noises of the carrier. The carrier 14A is moved by a drive force produced by the rotated rubber wheels 26.

The cart 12A has a width (dimension across the direction of movement of the vehicle body 10A) which is larger than that of the carrier 14A, so that three pairs of wheels 28 disposed along the opposite lateral sides of the cart 12A will not interfere with the carrier 14A. The carrier 14A has a pair of engagement pins 30, 30 which extend upright for engagement with respective holes formed in the cart 12A. The pins 30 and the holes are formed so as to provide a suitable clearance therebetween. Each of the front and rear portions of the card 12A has a pair of support members 34, 34 which extend upright. Each support member 34 is equipped at its top with a positioning pin 32 which is adapted to engage a corresponding hole formed in the floor panel of the vehicle body 10A. Thus, the body 10A is positioned on the cart 12A, by the positioning pins 32.

The cart 12A is moved to the first sealing station 16, and moved from the second sealing station 18, while the cart 12A is supported by the corresponding carrier 14A, like the cart 12C supported by the carrier 14C as illustrated in FIG. 2. However, at the first and second sealing stations 16, 18, and between these two stations 16, 18, the cart 12A is supported by a pair of guide rails 38, 38 which extend through the stations 16, 18. More specifically, the rails 38 have slopes 40, 41 at their longitudinal ends, so that the cart 12A can easily roll up and down the rails 38 when the cart 12A approaches and leaves the first and second sealing stations 16, 18, respectively. When the cart 12A rolls on the rails 38, the cart 12A is elevated from the carrier 14A, but is driven by the carrier 14A, with the engagement pins 30 engaging the cart 12A. For ensuring precise positioning of the cart 12A and therefore the vehicle body 10A thereon in the vertical and transverse (width) directions, the guide rails 38 are accurately formed and dimensioned, and the wheels 28 are made of a metallic material and accurately attached to the cart 12A. Since the engagement pins 30 engage the cart 12A with a suitable clearance therebetween, the cart 12A is permitted to be moved upward relative to the carrier 14A, when the wheels 28 roll up the guid rails 38. As indicated in FIG. 3, a first longitudinal positioning device 42 and a second longitudinal positioning device 43 are provided at each of the first and second sealing stations 16, 18, in order to position the vehicle body at the first and second stations 16, 18 in the longitudinal direction of the vehicle body, i.e., in the direction of movement of the vehicle body. Thus, the rails 38 cooperate with these longitudinal positioning devices 42, 43 to constitute a positioning device for positioning the vehicle bodies 10A, 10B, 10C, etc. at the sealing stations 16, 18, in the vertical, transverse and longitudinal directions. As indicated above, the engagement pins 30 are held engaged with the cart 12A, even while the cart 12A rests on the rails 38, so that the cart 12A can be moved from the first sealing station 16 to the second sealing station 18, by the movement of the electrically driven carrier 14A.

Above a transversely middle portion of the first sealing station 16, there is provided a support (not shown) on which a hood opening device 46 is mounted, as shown in FIGS. 1 and 2. The opening device 46 includes an industrial robot which is operated to automatically open and close an engine hood 44 (FIG. 2) provided to cover the engine room in the front section of the vehicle body (12B in FIGS. 1 and 2) positioned at the first sealing station 16. Further, on the transversely opposite sides of the first sealing station 16, there are provided door opening devices 48, 50 which are movable in the longitudinal direction of the vehicle body (10B), by respective longitudinal moving devices 52, 54 which extend in the longitudinal direction of the vehicle body. These door opening devices 48, 50 include industrial robots for automatically opening and closing a front and a rear door 56, 58. Similarly, another opening device 62 is provided above the second sealing station 18, in order to automatically open and close a luggage compartment door 60 (FIG. 2) provided to cover the laggage compartment of the vehicle body (10A in FIGS. 1 and 2) positioned at the second sealing station 18.

On the transversely opposite sides of the first sealing station 16, there are also provided longitudinal moving devices 64, 66, respectively, which extend in the longitudinal direction of the vehicle body (10B). Corresponding two intermediate sealing robots 68, 70 are supported by these moving devices 64, 66 so that the sealing robots 68, 70 are movable in the longitudinal direction of the vehicle body (10B). The intermediate sealing robots 68, 70 are assigned to perform sealing operations on the front and rear doors 56, 58, their vicinities, and the side surfaces of the engine hood 44 and luggage compartment door 60, which are nearer to the respective robots 68, 70 in the transverse direction of the vehicle body. The sealing robots 68, 70 are commercially available industrial robots with sealing nozzles attached to the free ends of their working arms. As described below, the sealing robots 68, 70 are operated to perform controlled sealing movements according to control commands or information from respective control units 104, 106. The control commands or information reflect the specific type of the vehicle body involved.

Between the first and second sealing stations 16, 18, a first and a second front/rear sealing robot 74, 76 are disposed on transversely opposite sides of the vehicle bodies (10A, 10B). These first and second front/rear sealing robots 74, 76 are supported on respective longitudinal moving devices 78, 80 which extend between the two sealing stations 16, 18, in the longitudinal direction of the vehicle bodies (10A, 10B), while being positioned transversely outwardly of the guide rails 38, 38. These sealing robots 74, 76 are assigned to apply suitable sealing materials to predetermined sealing portions in the engine room (inside of the front section) covered by the engine hood 44 of the vehicle body 10B positioned at the first sealing station 16, and to predetermined sealing portions in the luggage compartment (inside of the rear section) covered by the luggage compartment door 60 of the vehicle 10A positioned at the second sealing station 18. Described more specifically, the desired sealing part in the engine room of the vehicle body 10B consists of two areas which are divided by a longitudinal centerline of the vehicle body 10B. Similarly, the desired sealing part in the luggage compartment of the vehicle body 10A consists of two areas which are divided by a longitudinal centerline of the vehicle body 10A. Each sealing robot 74, 76 is adapted to perform sealing operations in one of the two areas in the engine room which is located a greater distance away from the corresponding robot 74, 76 than from the other area, and in one of the two areas in the luggage compartment which is located a greater distance away from the robot 74, 76 than from the other area. The first and second front/rear sealing robots 74, 76 are operated simultaneously to effect concurrent sealing operations on the two vehicle bodies 10A, 10B at the first and second sealing stations 16, 18. That is, the first front/rear sealing robot 74 performs the sealing operations at the first and second sealing stations 16, 18 while the second front/rear sealing robot 76 are performing the sealing operations at the second and first sealing stations 18, 16, respectively. The first and second sealing stations 16, 18 are provided with first and second body-discriminating devices 82, 84, respectively, as indicated in FIG. 3. The body-discriminating devices 82, 84 are adapted to detect the types of the vehicle bodies 10A, 10B, 10C, etc. which are positioned at the first and second sealing stations 16, 18.

The hood opening device 46, the door opening devices 48, 50, the luggage compartment door opening device 62, the intermediate sealing robots 68, 70, and the first and second front/rear sealing robots 74, 76 are controlled by a main controller 90 as indicated in FIG. 3, which shows a control system for the sealing apparatus described above. The control console 20 for the electrically driven carriers 14A, 14B, 14C, etc., and the first and second body-discriminating devices 82, 84 are connected to the main controller 90. The carrier-position sensors 24, and the first and second longitudinal positioning devices 42, 43 for the first and second sealing stations 16, 18, are connected to the carrier control console 20. Based on the signals from the control console 20 and the body-discriminating devices 82, 84, the main controller 90 operates to control the opening devices 46, 48, 50, 62 and the sealing robots 68, 70, 74 and 76, through respective control units 96, 98, 100, 102, 104, 106, 108 and 110, which are electrically interlocked.

The operation of the present sealing apparatus will be described.

To begin with, sealing operations at the first and second sealing stations 16, 18 which are performed with the vehicle bodies being intermittently fed will be described, by reference to the block diagram of FIG. 3. When the predetermined sealing cycles at the first and second sealing stations 16, 18 are completed, the sealing robots 68, 70, 74, 76 are restored to their original rest positions prior to comencement of the next sealing cycle. In the rest positions, the sealing robots are located so as to avoid an interference with the moving vehicle bodies to and from the sealing stations 16, 18. With the robots returned to their rest positions, a signal is fed to the main controller 90, which in turn applies a reset signal to the first and second longitudinal positioning devices 42, 43, in order to return these positioning devices to their original retracted positions, from their advanced operated positions for positioning the vehicle bodies. The main controller 90 further commands the carrier control console 20, so as to operate the carriers 14A, 14B, 14C, etc. As a result, the vehicle body which has stayed at the second sealing station 18 leaves this station, and the vehicle body which has stayed at the first sealing station 16 is moved to the second sealing station 18. Further, the vehicle body which has stayed at the standby station 15 is moved to the first sealing station 16. The vehicle bodies which have been moved to the first and second stations 16, 18 are then vertically and transversely positioned by means of the carts 12B, 12A and the guide rails 38, and further positioned longitudinally by the respective first and second longitudinal positioning devices 42, 43 provided at the first and second stations 16, 18. FIGS. 1 and 2 show the conditions in which the vehicle bodies 10A and 10B are newly positioned at the second and first sealing stations 18, 16, respectively, after the last sealing cycles are completed and the successive vehicle bodies are fed by the predetermined distance.

Upon completion of the longitudinal positioning of the vehicle bodies 10A, 10B by the longitudinal positioning devices 42, 43, signals are fed from the devices 42, 43 to the main controller 90 via the carrier control console 20. Substantially simultaneously, the first and second body-discriminating devices 82, 84 produce body-discriminating signals indicative of the types of the bodies 10B and 10A positioned at the first and second stations 16, 18. These body-discriminating signals are received by the main controller 90, which in turn applies door-opening signals and body signals to the opener control unite 96, 98, 100, 102. The body signals represent the types of the bodies 10A, 10B. According to these door-opening signals and the body signals, the hood opening device 46, door opening devices 48, 50 and luggage compartment door opening device 62 are operated to open the engine hood 44, front and rear doors 56, 58 and luggage compartment door 60, to the predetermined positions. In response to signals indicative of the completion of opening actions of the respective hood or doors, which are produced by the control units 96, 98, 100, 102, the main controller 90 applies sealing-start signals and the body signals to the robot control units 104, 106, 108, 110, whereby the sealing operations are performed by the sealing robots 68, 70, 74, 76, depending upon the specific types of the vehicle bodies 10A, 10B positioned at the sealing stations 18, 16.

The first and second front/rear sealing robots 74, 76 perform the sealing operations concurrently on the different vehicle bodies 10A and 10B, in the following manner. Initially, the first front/rear sealing robot 74 applies a sealing material to the predetermined portions in one of the two areas or halves in the luggage compartment of the vehicle body 10A at the second sealing station 18, which one area is more remote from the sealing robot 74 than the other area. At the same time, the second front/rear sealing robot 76 applies a sealing material to the predetermined portions in one of the two areas or halves in the engine room of the vehicle body 10B at the first sealing station 16, which one area is more remote from the sealing robot 76 than the other area. The areas sealed by the first and second front/rear sealing robots 74, 76 as described above are indicated in FIG. 4 by hatched lines which are inclined upward from left to right. Therefore, the sealing robot 74 receives the commands to seal the above-indicated area of the luggage compartment of the vehicle body 10A, and the information indicative of the type of the body 10A, while the sealing robot 76 receives the commands to seal the above-indicated area of the engine room of the vehicle body 10B, and the information indicative of the type of the body 10B.

Figure 4:
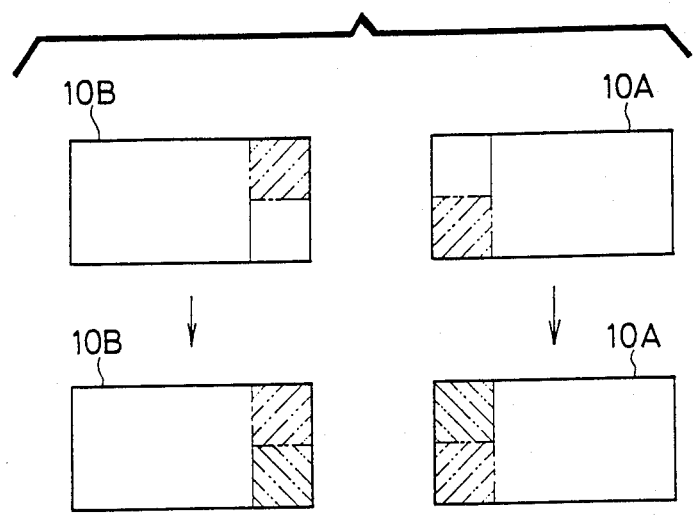
FIG. 4 is an illustration showing a manner in which sealing operations are performed by the apparatus of FIGS. 1–3.

After the above sealing operations on the vehicle bodies 10A and 10B at the second and first sealing stations 18, 16 are completed, the sealing robots 74, 76 are returned to their original retracted positions, and generate signals indicating the completion of the sealing operations. Then, the main controller 90 commands the first front/rear sealing robot 74 to apply the sealing material to the predetermined portions in the other area or half of the engine room of the body 10B at the first sealing station 16. At the same time, the main controller 90 commands the second front/rear sealing robot 76 to apply the sealing material to the predetermined portions in the other area or half of the luggage compartment of the vehicle body 10A at the second sealing station 18. Namely, the areas of the engine room and luggage compartment of the vehicle bodies 10B, 10A which have not been sealed are now sealed by the first and second robots 74, 76. These sealing operations are indicated in FIG. 4 by hatched lines which are inclined downward from left to right.

When the sealing robots 68, 70, 74 and 76 have completed the predetermined sealing operations and have been returned to their original retracted positions, signals indicative of the completion of the sealing operations are fed to the main controller 90. In response to these signals, the controller 90 applies door-closing signals to the opener control units 96, 98, 100, 102, to close the engine hood 44, and the doors 56, 58, 60. Upon closure of these hood 44 and doors 56, 58, 60, the main controller 90 commands the longitudinal positioning devices 42, 43 to release the longitudinal positioning of the vehicle bodies 10A, 10B, and then commands the carrier control console 20 to move the carriers 14A, 14B (and other carriers 14C, etc.), whereby the vehicle body 10A is fed forward from the second sealing station 18, and the vehicle body 10B is moved from the first sealing station 16 to the second sealing station 18. Simultaneously, the vehicle body 10C which has stayed at the standby station 15 is moved to the first sealing station 16.

The operations described above are repeatedly implemented to effect the predetermined sealing operations on the intermittently moved successive vehicle bodies. In the present embodiment wherein the vehicle bodies are positioned in the vertical, transverse and longitudinal directions, the sealing operations are performed with improved accuracy. Further, since the front/rear sealing robots 74, 76 are located on the transversely opposite sides of the vehicle bodies or conveyor system (carts 12, carriers 14, rails 38, etc.), the robots 74, 76 do not have to be large-sized, and can be manufactured with increased precision. In this sense, too, the present sealing apparatus permits sealing operations with improved accuracy.

In addition, there exists no possibility of an intefer- ence between the first and second front/rear sealing robots 74, 76, since these robots simultaneously perform sealing operations on the different vehicle bodies (10A, 10B) at the different sealing stations 18, 16.

Further, the vehicle bodies are moved from the first sealing station 16 to the second sealing station 18, while the vehicle bodies are held positioned in the vertical and transverse directions, by the positioning device which includes the guide rails 38. In other words, it is not necessary to release otherwise provided vertical and transverse positioning devices prior to moving the vehicle bodies, and re-position the vehicle bodies after they have been positioned at the sealing stations 16, 18. This not only simplifies the control system, but also reduces the non-productive times for pre-sealing and post-sealing operations, resulting in significant reduction in the total cycle time.

While the above description refers to the sealing operations which are performed at both of the first and second sealing stations 16, 18, it is possible that the sealing operations are performed at only one of the two sealing stations 16, 18. In this case, one of the front/rear sealing robots 74, 76 is held in its standby or retracted position while the other front/rear sealing robot 74, 76 is performing the sealing operations at one of the two stations 16, 18.

For instance, the sealing operations will be achieved in the following manner, in the case where the vehicle body 10B is placed on the first sealing station 16, while no vehicle body is present at the second sealing station 18.

When the vehicle body 10B is introduced into the first sealing station 16, the main controller 90 receives only the signal indicative of the completion of loading of the vehicle body 10B to the first sealing station 16, and the body-discriminating signal from the first body-discriminating device. Accordingly, the main controller 90 produce only the commands relating to the sealing operations on the vehicle body 10B at the first sealing station 16. More particularly, the hood opening device 46, and the door opening devices 48, 50 are activated to open the engine hood 44, and the doors 56, 58, and the intermediate sealing robots 68, 70 are activated. However, only the second front/rear sealing robot 76 is commanded to perform the sealing operations on the vehicle body 10B at the first sealing station 16. More precisely, the second sealing robot 76 is operated to apply the sealing material to a remote one of the two halves of the predetermined sealing part in the engine room of the vehicle body 10B, according to the information indicative of the type of the vehicle body 10B. On the other hand, the first front/rear sealing robot 74 is not commanded to operate, and is held in its retracted position. After the above sealing operations in the remote half of the engine room of the vehicle body 10B are completed by the second front/rear sealing robot 76, a signal indicative of the completion is received by the main controller 90. As a result, the main controller 90 commands the first front/rear sealing robot 74 to start the sealing operations in the other or non-sealed half of the engine room of the vehicle body 10B, according to the information indicative of the type of the body 10B.

In the case where the vehicle body 10A is present at the second sealing station 18 while no vehicle body is present at the first sealing station 16, the sealing operations are performed differently. That is, only the door opening device 62 is activated to open the luggage compartment door 60. Then, the first front/rear sealing robot 74 is initially activated while the second front/rear sealing robot 76 is held in its retracted position. Then, the second front/rear sealing robot 76 is activated while the first front/rear sealing robot 74 is held in its retracted position.

It is possible that a vehicle body may be loaded to the first sealing station 16 while the sealing operations are performed on the vehicle body at the second sealing station 18. If the vehicle body is loaded to the first sealing station 16 during the sealing operations at the second sealing station 18 by the first front/rear sealing robot 74 (that is, before commencement of the sealing operations at the second sealing station 18 by the second front/rear sealing robot 76), the second sealing robot 76 is immediately activated to effect sealing operations on the newly loaded vehicle body at the first sealing station 16. The subsequent sealing operations are performed in the same manner as in the case where the vehicle bodies are present at both of the two sealing stations 16, 18.

In the case where the vehicle body is loaded to the first sealing station 16 during the sealing operations at the second station 18 by the second front/rear sealing robot 76 (after the sealing operations at the second station by the first sealing robot 74), the sealing operations on the newly introduced vehicle body at the first station 16 are commenced after the sealing operations at the second station 18 by the second sealing robot 76 are completed. Namely, the sealing operations at the first station 16 are accomplished in the same manner as in the case where the first station 16 is loaded with a vehicle body.

In the illustrated embodiment, the first front/rear sealing robot 74 is activated to first perform sealing operations on the vehicle body at the second sealing station 18, and then effect sealing operations on the vehicle body at the first sealing station 16. On the other hand, the second front/rear sealing robot 76 is operated to perform sealing operations first at the first sealing station 18 and then at the second sealing station 16. However, it is possible that the first sealing robot 74 is operated to first perform the sealing operations at the first sealing station 16 and then at the second sealing station 18, while the second sealing robot 76 is activated to effect the sealing operations in the reverse order.

While the illustrated embodiment is adapted such that the intermediate section of the vehicle body is sealed at the first sealing station 16, the present invention may apply to a sealing apparatus which is capable of effecting sealing operations only in the front and rear sections (engine room and luggage compartment) of the vehicle body.

In the illustrated sealing apparatus, the conveyor system or device for moving the vehicle bodies is constituted by the carts 12, carriers 14, rails 38, etc. However, a conveyor belt or similar device may be employed. Further, the vehicle bodies may be directly mounted and positioned on suitable support blocks provided at the sealing stations.

Figure 6:
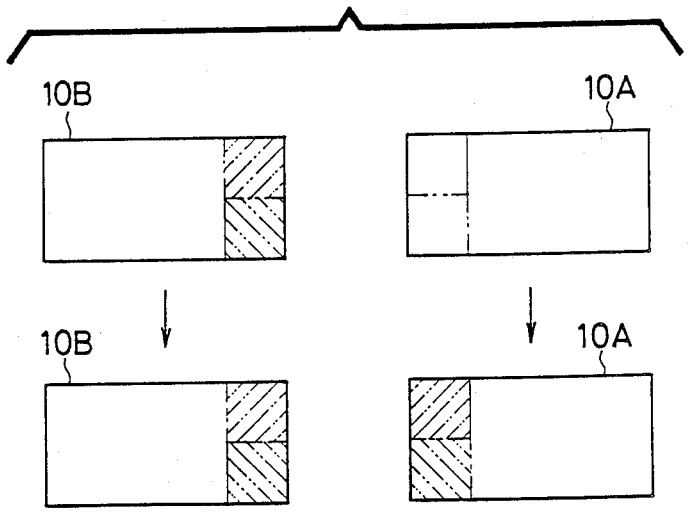
FIG. 6 is an illustration corresponding to that of FIG. 4, showing a modified sealing manner.

As described above, the first and second front/rear sealing robots 74, 76 of the illustrated sealing apparatus are adapted to perform sealing operations alternately, in the remote one of the two areas in the engine room of the vehicle body at the first sealing station 16, and in the remote one of the two areas in the luggage compartment of the vehicle body at the second sealing station 18. However, the first and second front/rear sealing robots 74, 76 are modified, as shown in FIG. 5, so as to apply the sealing materials alternately to one of the two areas in the engine room which is nearer to the robots, and to one of the two areas in the luggage compartment which is nearer to the robots. In this case, too, the sealing operations by the first and second sealing robots 74, 76 may be effected simultaneously on the different vehicle bodies at the two sealing stations 16, 18. However, it is also possible that the two front/rear sealing robots 74, 76 modified as shown in FIG. 5 are simultaneously performed on the same vehicle body (10B or 10A) at the first or second sealing station 16, 18, as indicated in FIG. 6. In this instance, the sealing operations on the vehicle body 10B at the first station 16 may precede the sealing operations on the vehicle body 10A at the second station 18, or vice versa.

Although the illustrated sealing apparatus is adapted such that the vehicle bodies are positioned at the sealing stations 16, 18 relative to the stationary sealing robots, it is possible that the sealing robots move with the vehicle bodies so that the sealing operations are accomplished during movements of the vehicle bodies and the robots.

It is to be understood that the present invention may be embodied with various other changes, modifications and improvements, which may occur to those skilled in the art, without departing from the spirit and scope of the invention defined in the following claims.

What is claimed is:

1. A method of applying a sealing material to predetermined portions of a body of an automotive vehicle which include seams of component members of the body, comprising the steps of:

arranging two vehicle bodies in series such that front and rear sections of said two vehicle bodies face each other;

providing a first front/rear sealing robot on one of transversely opposite sides of said two vehicle bodies and a second front/rear sealing robot on the other side;

effecting a first sealing operation which includes (a) operating said first front/rear sealing robot to apply a sealing material to predetermined sealing portions in one of two areas in an engine room covered by an engine hood of one of said two vehicle bodies, and (b) operating said second front/rear sealing robot to apply a sealing material to predetermined portions in one of two areas in a luggage compartment covered by a luggage compartment door of the other vehicle body, said two areas in said engine room being divided by a longitudinal centerline of said one vehicle body, and said two areas in said luggage compartment being divided by a longitudinal centerline of said other vehicle body; and effecting a second sealing operation which includes (c) operating said first front/rear sealing robot to apply a sealing material to predetermined sealing portions in the other of said two areas in said luggage compartment of said other vehicle body, and (d) operating said second front/rear sealing robot to apply a sealing material to predetermined sealing portions in the other of said two areas in said engine room of said one vehicle body.

2. A method according to claim 1, wherein said one of said two areas in said engine room of said one vehicle body is located a greater distance away from said first front/rear sealing robot than said other area in said engine room, and said one of said two areas in said luggage compartment of said other vehicle body is located a greater distance away from said second front/rear sealing robot than said other area in said luggage compartment.

3. A method of applying a sealing material to predetermined portions of a body of an automotive vehicle which include seams of component members of the body, comprising the steps of:

arranging two vehicle bodies in series such that front and rear sections of said two vehicle bodies face each other;

providing a first front/rear sealing robot on one of transversely opposite sides of said two vehicle bodies, and a second front/rear sealing robot on the other side;

effecting a first sealing operation which includes (a) operating said first front/rear sealing robot to apply a sealing material to predetermined sealing portions in one of two areas in an engine room covered by an engine hood of one of said two vehicle bodies, and (b) operating said second front/rear sealing robot to apply a sealing material to predetermined portions in the other of said two areas in said engine room, said two areas in said engine room being divided by a longitudinal centerline of said one vehicle body; and effecting a second sealing operation which includes (c) operating said first front/rear sealing robot to apply a sealing material to predetermined sealing portions in one of two areas in a luggage compartment covered by a luggage compartment door of the other vehicle body, and (d) operating said second front/rear sealing robot to apply a sealing material to predetermined sealing portions in the other of said two ares in said luggage compartment of said other vehicle body, said two areas in said luggage compartment being divided by a longitudinal centerline of said other vehicle body.

4. An apparatus for applying a sealing material to predetermined portions of a body of an automotive vehicle which include seams of component members of the body, comprising:
- a first sealing station and a second sealing station, which are fixedly disposed in series;
- a conveyor device for moving vehicle bodies to and from said first and second sealing stations, such that front and rear sections of two successive vehicle bodies face each other in a direction of movement of said vehicle bodies, each of said vehicle bodies having an engine room covered by an engine hood, and a luggage compartment covered by a luggage compartment door, each of said engine room and said luggage compartment having two areas divided by a longitudinal centerline of the corresponding vehicle;
- a positioning device provided for each of said first and second sealing stations, for positioning the vehicle bodies at predetermined positions at said first and second sealing stations, respectively;
- a first front/rear sealing robot disposed on one of transversely opposite sides of said conveyor device, and between said first and second sealing stations, and operable for applying a sealing material to predetermined sealing portions in said engine room of the vehicle body positioned at said first sealing station, and in one of two areas in said luggage compartment of the vehicle body positioned at said second sealing station;
- a second front/rear sealing robot disposed on the other side of said conveyor device, in aligned relation with said first front/rear sealing robot, and operable for applying a sealing material to predetermined sealing portions in said engine room of said vehicle body at said first sealing station, and in said luggage compartment of said vehicle body at said second sealing station; and
- control means for controlling said first and second front/rear sealing robots such that said first front/rear sealing robot applies the sealing material to one of said two areas in said engine room of the vehicle body positioned at said first sealing station, and to one of said two areas in said luggage compartment of the vehicle body positioned at said second sealing station, while said second front/rear sealing robot applies the sealing material to the other of said two areas in said engine room of the vehicle body at said first sealing station, and to the other of said two areas in said luggage compartment of the vehicle body at said second sealing station.

5. An apparatus according to claim 4, wherein said first front/rear sealing robot is operable to apply the sealing materials alternately to said one of said two areas in said engine room and to said one of said two areas in said luggage compartment, said one area in said engine room being located a greater distance away from said first front/rear sealing robot than said other area in said engine room, and said one area in said luggage compartment being located a greater distance away from said first front/rear sealing robot than said other area in said luggage compartment, said second front/rear sealing robot being operable to apply the sealing materials alternately to said other areas in said engine room and said luggage compartment, said second front/rear sealing robot being capable of performing sealing operations on the vehicle bodies at said first and second sealing stations while said first front/rear sealing robot is performing sealing operations on the vehicle bodies at said second and first sealing stations, respectively.

6. An apparatus according to claim 4, wherein said first front/rear sealing robot is operable to apply the sealing materials alternately to said one of said two areas in said engine room and to said one of said two areas in said luggage compartment, said one area in said engine room being located a smaller distance away from said first front/rear sealing robot than said other area in said engine room, and said one area in said luggage compartment being located a smaller distance away from said first front/rear sealing robot than said other area in said luggage compartment, said second front/rear sealing robot being operable to apply the sealing materials alternately to said other areas in said engine room and said luggage compartment, said second front/rear sealing robot being capable of performing sealing operations on the vehicle bodies on said first and second sealing stations while said first front/rear sealing robot is performing sealing operations on the vehicle bodies at said second and first sealing stations, respectively.

7. An apparatus according to claim 4, wherein said first and second front/rear sealing robots are capable of applying simultaneously the sealing materials to said two areas in one of said engine room of the vehicle body at said first sealing station and said luggage compartment of the vehicle body at said second sealing station, and subsequently applying simultaneously the sealing materials to said two areas in the other of said engine room and said luggage compartment.

8. An apparatus according to claim 4, wherein said conveyor device comprises a plurality of carts for supporting and positioning said vehicle bodies, respectively, and means for moving said plurality of carts to said first and second sealing stations, and said positioning device comprises guide rails which extend through said first and second sealing stations and which support said plurality of carts so as to position said carts in a transverse direction thereof, and longitudinal positioning means provided for each of said first and second sealing stations for positioning said plurality of carts in a longitudinal direction thereof.

9. An apparatus, according to claim 6, further comprising discriminating means for detecting different types of said vehicle bodies, and wherein said first and second front/rear sealing robots are operable to effect sealing operations depending upon the detected types of said vehicle bodies, whereby the sealing operations can be effected for said different types of vehicle bodies.

10. An apparatus according to claim 4, further comprising a hood opening device disposed at said first sealing station for automatically opening and closing said engine hood, and a door opening device disposed at said second sealing station for automatically opening and closing said luggage compartment door.

* * * * *